(12) United States Patent
Brondijk

(10) Patent No.: US 7,496,017 B2
(45) Date of Patent: Feb. 24, 2009

(54) METHOD FOR FORMATTING AN OPTICAL DISC

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 368 days.

(21) Appl. No.: 10/555,749

(22) PCT Filed: May 4, 2004

(86) PCT No.: PCT/IB2004/050569

§ 371 (c)(1), (2), (4) Date: Nov. 4, 2005

(87) PCT Pub. No.: WO2004/100159

PCT Pub. Date: Nov. 18, 2004

(65) Prior Publication Data

US 2007/0053267 A1   Mar. 8, 2007

(30) Foreign Application Priority Data

May 9, 2003   (EP)   .................................. 03101295

(51) Int. Cl.
G11B 7/00   (2006.01)
(52) U.S. Cl. .................................. 369/53.24; 369/53.41
(58) Field of Classification Search ................ 369/53.24
See application file for complete search history.

(56) References Cited

U.S. PATENT DOCUMENTS

| | | | |
|---|---|---|---|
| 4,901,300 A | 2/1990 | Van Der Zande et al. | |
| 5,187,699 A | 2/1993 | Raaymakers et al. | |
| 6,151,281 A | 11/2000 | Van Der Enden et al. | |
| 6,538,982 B1 | 3/2003 | Van Nlerken et al. | |
| 2002/0136137 A1* | 9/2002 | Shishido et al. | 369/59.25 |
| 2002/0150014 A1* | 10/2002 | Nijboer et al. | 369/47.54 |
| 2003/0218951 A1* | 11/2003 | Suzuki et al. | 369/53.24 |
| 2004/0196748 A1* | 10/2004 | Bakx et al. | 369/30.04 |

FOREIGN PATENT DOCUMENTS

| | | |
|---|---|---|
| EP | 0899735 A1 | 3/1999 |
| EP | 1282128 A1 * | 2/2003 |
| JP | 08203211 A | 8/1996 |

OTHER PUBLICATIONS

ISR Publication, International Publication No. WO2004/100159A1.

* cited by examiner

Primary Examiner—Wayne R Young
Assistant Examiner—Lixi Chow
(74) Attorney, Agent, or Firm—Michael E. Belk

(57) ABSTRACT

A device for recording information writes marks in a track on a record carrier of a re-writable type. The device records the information according to a predefined recording format like DVD for constituting a recording area containing user data preceded by a lead-in zone. The device has a formatting unit (36) for formatting the record carrier. First it is detected if the record carrier has been recorded before. If so, a size is determined of a pre-existing contiguously written area that extends from the beginning of the recording area. The formatting includes writing data on the record carrier indicating that the recording area does not contain user data. Formatting status information is provided on the record carrier indicating the size of the pre-existing contiguously written area.

11 Claims, 5 Drawing Sheets

Figure 2:
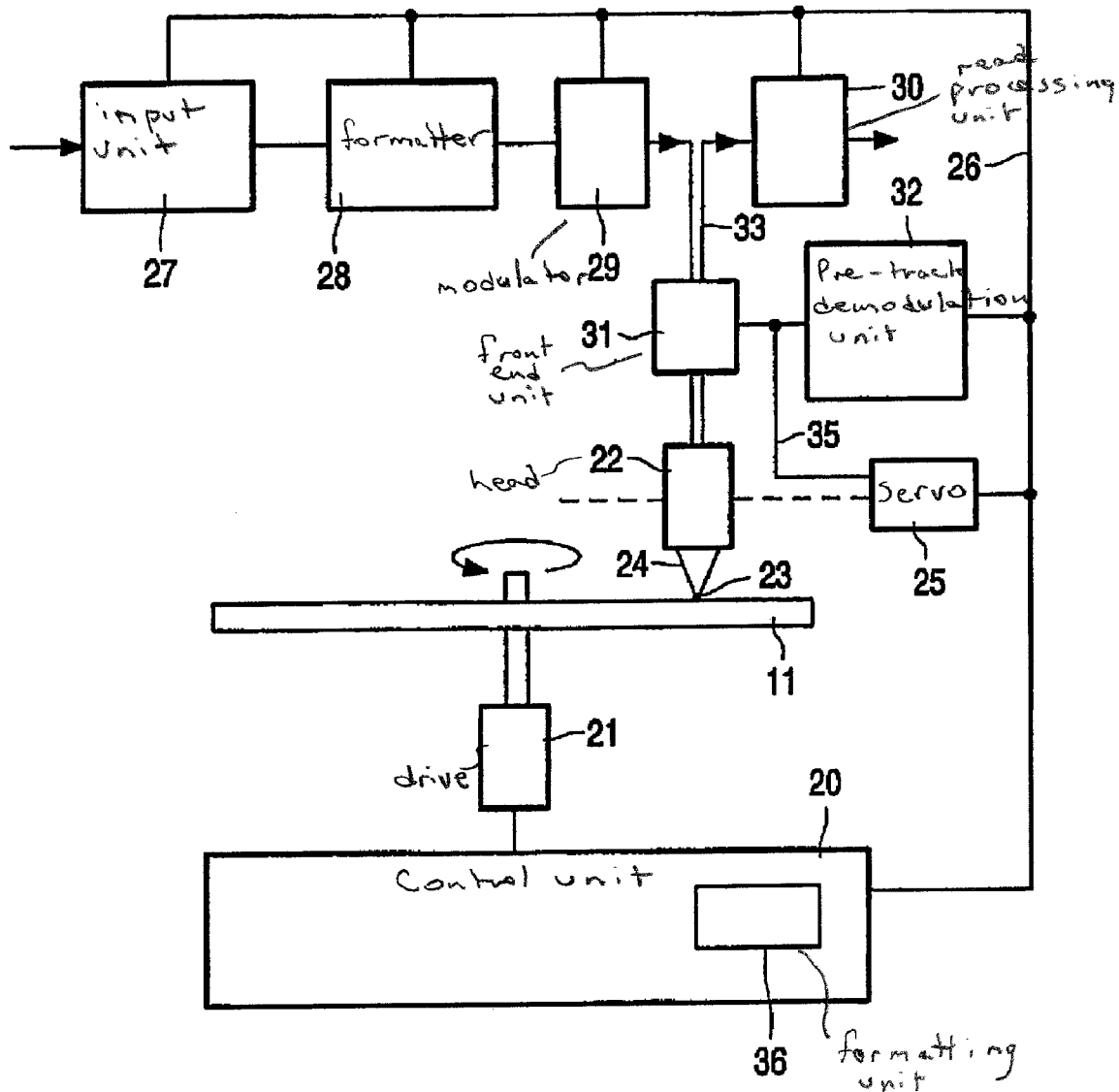

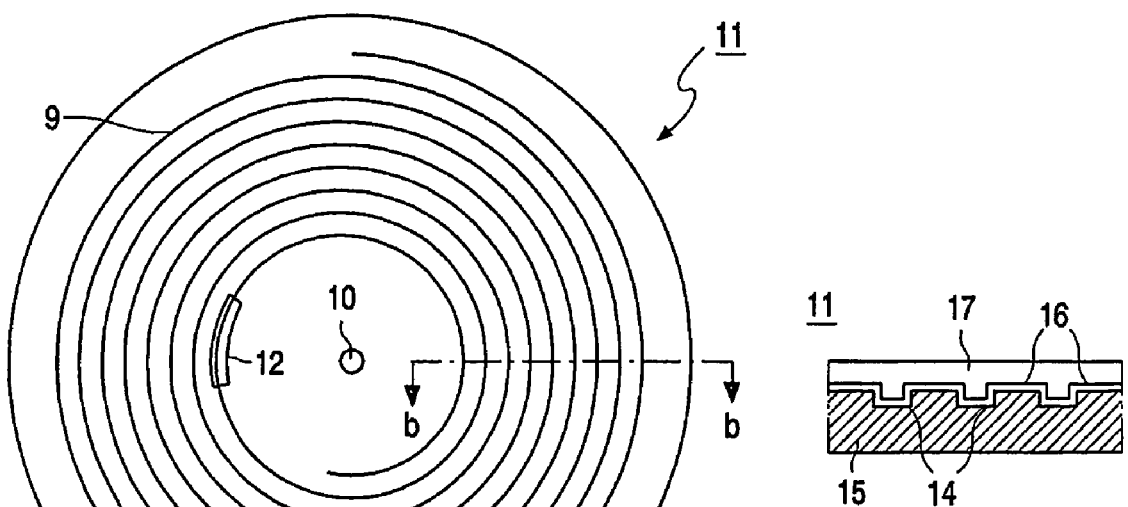
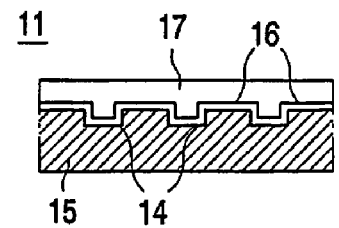
FIG. 1b
FIG. 1a
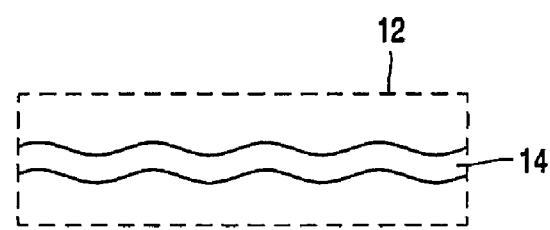
FIG. 1c

| Physical Sector of BCC block | Main Data byte position | Description | number of bytes |
|---|---|---|---|
| 0 | $D_0$ to $D_3$ | Content Descriptor | 4 |
| 0 | $D_4$ to $D_7$ | Unknown Content Descriptor Actions | 4 |
| 0 | $D_8$ to $D_{39}$ | Drive ID | 32 |
| 0 | $D_{40}$ to $D_{43}$ | FDCB update count | 4 |
| 0 | $D_{44}$ to $D_{47}$ | Formatting status and mode | 4 |
| 0 | $D_{48}$ to $D_{51}$ | Last written address | 4 |
| 0 | $D_{52}$ to $D_{55}$ | Last verified address | 4 |
| 0 | $D_{56}$ to $D_{59}$ | Bitmap Start Address | 4 |
| 0 | $D_{60}$ to $D_{63}$ | Bitmap Length | 4 |
| 0 | $D_{64}$ to $D_{95}$ | Disc ID | 32 |
| 0 | $D_{96}$ to $D_{127}$ | Application dependent | 32 |
| 0 | $D_{128}$ to $D_{191}$ | List of DCBs | 16×4 |
| 0 | $D_{192}$ to $D_{2\,047}$ | Reserved and set to (00) | 1 856 |
| 1 to 9 | $D_0$ to $D_{2\,047}$ | Formatting bitmap | 9×2 048 |
| 10 to 15 | $D_0$ to $D_{2\,047}$ | Reserved and set to (00) | 6×2 048 |

FIG. 5

METHOD FOR FORMATTING AN OPTICAL DISC

The invention relates device for recording information on a record carrier of a writable type by writing marks in a track.

The invention further relates to a method and computer program product for recording the record carrier.

The invention in particular relates to formatting the record carrier.

A device and method for recording an optical record carrier are known from U.S. Pat. No. 6,151,281. The record carrier has a pre-track pattern constituted by a guide groove, usually called pregroove, for indicating the position of tracks in which the information is to be recorded. The information is encoded according to a predefined recording format (for example DVD, Digital Versatile Disc) and represented by recording optically readable marks. The pregroove is meandering by a periodic excursion of the track in a transverse direction (further denoted as wobble). The wobble may be varied in period according to additional information such as addresses. A recording device is provided with a head for generating a beam of radiation for scanning the track and writing the marks. At first use a blank record carrier is provided with a predefined amount of control data to indicate the status of the record carrier. Further some data may be recorded in the recording area, for example file system information. Initializing the record carrier as indicated is usually called formatting.

When the record carrier is to be read in a playback device designed for prerecorded discs, such a playback device will, according to the predefined recording format expect a fully recorded disc, in particular not containing blank areas. Such blank, unrecorded areas are usually called 'ice', because a playback device that cannot detect the pregroove will loose control when trying to read an 'iced' area. In the US document a method of formatting the record carrier is described, in which a contiguously written area is created starting from the beginning of the recording area, usually called de-icing. A parameter indicating the end of the contiguously written area and further administrative data on the de-icing are stored on the record carrier as status information. A problem of the known formatting is that writing the contiguous area takes a considerable amount of time, causing annoying delays for the user.

Therefore it is an object of the invention to provide a device and method for formatting a record carrier for preventing delays when the record carrier needs to be prepared for use in a playback device.

According to a first aspect of the invention the object is achieved with a device for recording information on a record carrier of a re-writable type by writing marks in a track on a recording layer via a beam of radiation, the recording layer comprising a pre-track pattern indicating the position of the track, the device comprising a head for providing the beam, recording means for recording the information in the track according to a predefined recording format for constituting a recording area containing user data preceded by a lead-in zone located at the start of the recording layer, and formatting means for formatting the record carrier, the formatting comprising writing control data on the record carrier indicating that the recording area does not contain user data, and providing on the record carrier status information indicating a size of a contiguously written area that extends from the beginning of the recording area in dependence on detecting a pre-existing contiguously written area that extends from the beginning of the recording area.

According to a second aspect of the invention the object is achieved with a method as defined in claim 6. According to a third aspect of the invention the object is achieved with a computer program product as defined in claim 7.

The effect of the measures is that a re-writable disc that has been formatted earlier will be re-formatted very quickly, because the contiguous area is not written again. This has the advantage for the user that the disc will be ready for playback immediately. Further unnecessary wear of the record carrier and recording device is prevented.

The invention is also based on the following recognition. The record carrier needs to be readable on existing reading devices, for example DVD (Digital Versatile Disc) players. The reading devices will perform a disc loading procedure in a predictable way; in particular the playback devices require a contiguously recorded area of a predefined size, e.g. up to a radius of 29 mm in a DVD. In the current implementation of DVD+RW data drives, the format command results in re-writing the lead-in area and thereby "forgetting" the state of the disc (the last recorded address is reset, along with the end-user pointer in the control data zone and the de-ice tables). Hence when a re-writable disc is to be formatted by a user command, the inventors have seen that valuable information is lost if the record carrier is treated as a blank record carrier by resetting the lead-in zone and other control data to a virgin state. Such a virgin state requires a lengthy process of writing dummy data up to the predefined size when the user prepares the record carrier for use in playback devices ("DVD-ROM Compliant"). By maintaining the pre-existing control information about the de-icing state of the record carrier unnecessary delays are prevented.

In an embodiment of the device the formatting means are arranged for said detecting by retrieving status information indicating a size of a contiguously written area that extends from the beginning of the recording area. This has the advantage that the size of a pre-existing contiguous area is easily established.

In an embodiment of the device the formatting means are arranged for said providing by maintaining the status information as retrieved in the event of a previously written record carrier. This has the advantage that the status information corresponding to the actual status of written areas of the record carrier is re-used. The response to a format command will be very quick because no control data and no dummy filling data need to be recorded.

Further preferred embodiments of the device according to the invention are given in the further claims.

Figure 3:
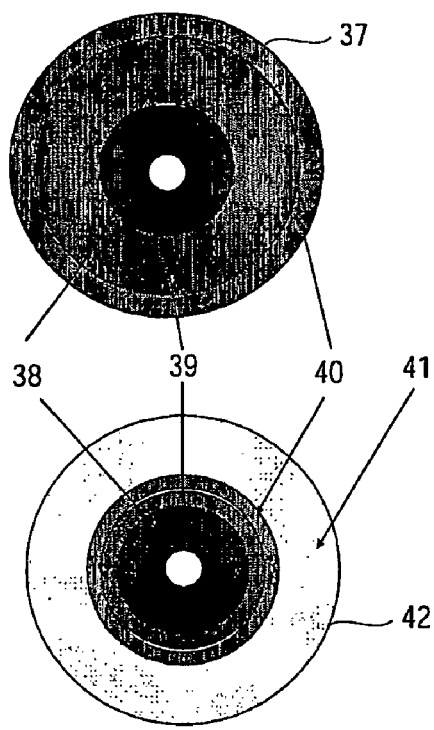
Figure 4:
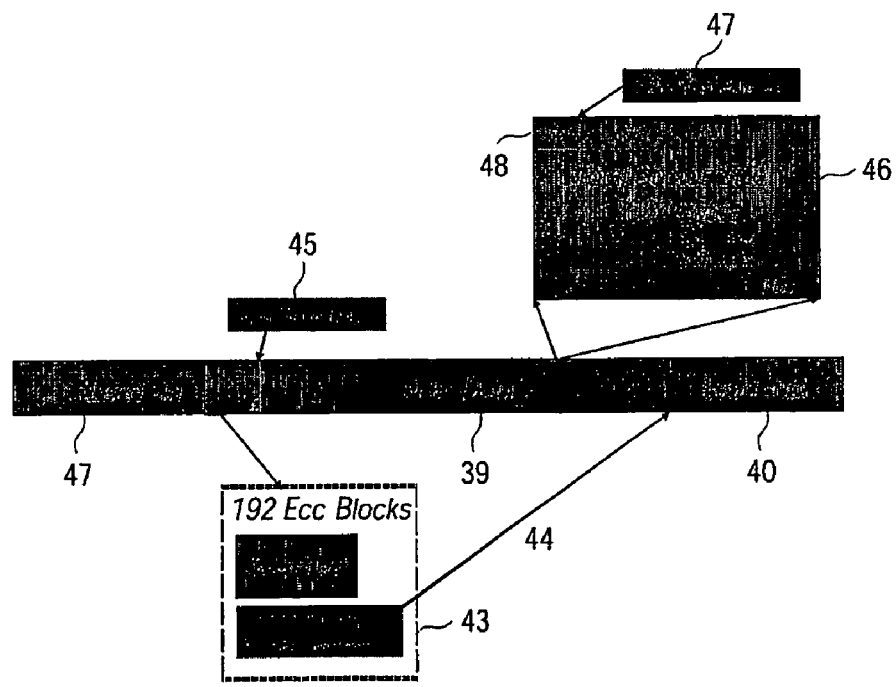
Figure 6:
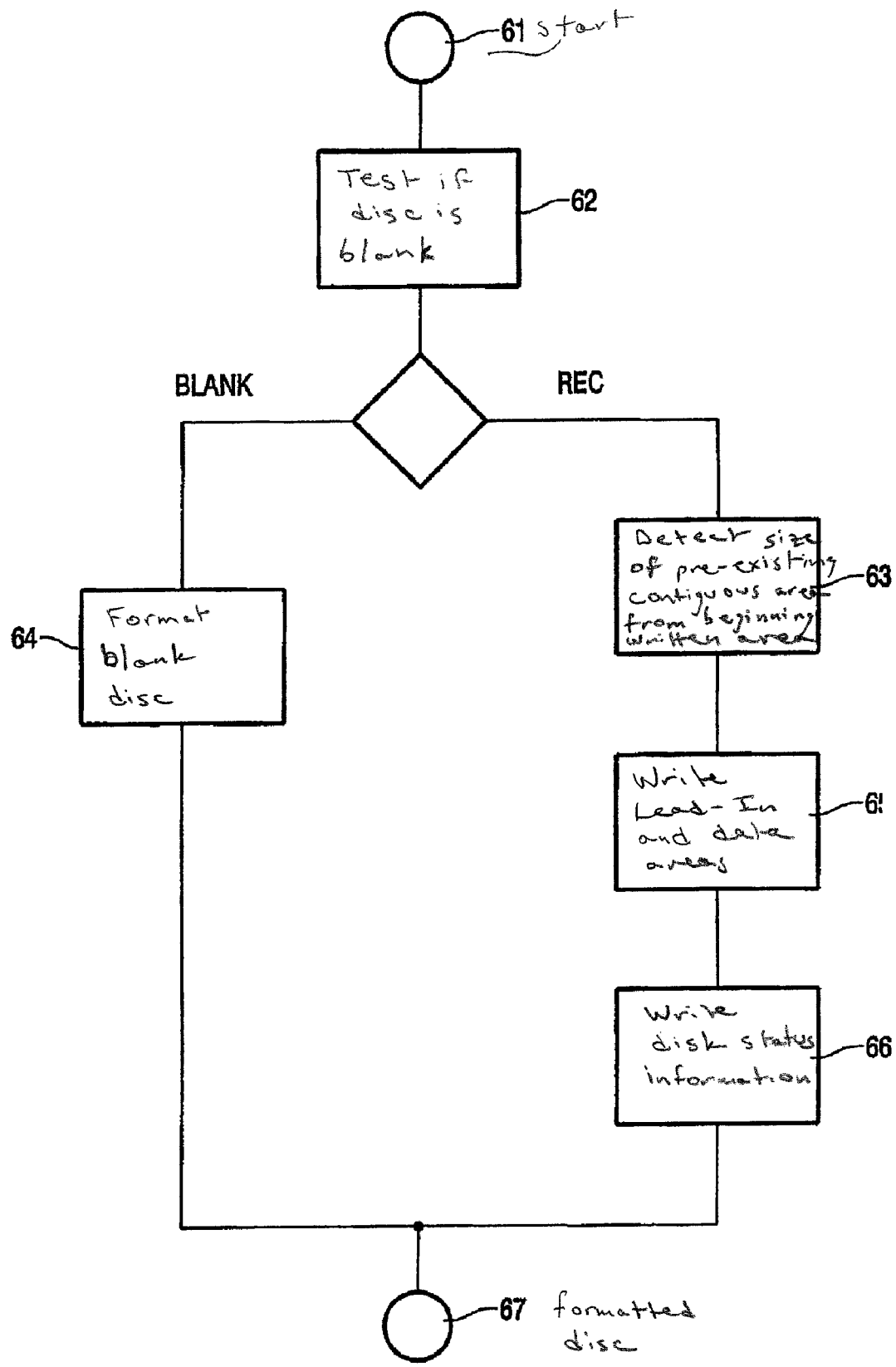

These and other aspects of the invention will be apparent from and elucidated further with reference to the embodiments described by way of example in the following description and with reference to the accompanying drawings, in which FIG. 1a shows a disc-shaped record carrier (top view), FIG. 1b shows a cross-section taken of the record carrier, FIG. 1c shows an example of a wobble of the track, FIG. 2 shows a recording device having a formatting function, FIG. 3 shows a record carrier having information according to a predefined recording format, FIG. 4 shows a logical layout of a recordable disc according to the DVD recording format, FIG. 5 shows formatting control data, and FIG. 6 shows formatting of a re-writable record carrier.

In the Figures, elements which correspond to elements already described have the same reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

FIG. 1b is a cross-section taken along the line b-b of the record carrier 11 of the recordable type, in which a transparent substrate 15 is provided with a recording layer 16 and a protective layer 17. The pre-track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A pre-track structure may also be formed by regularly spread sub-tracks or pre-pits which periodically cause servo signals to occur. The record carrier may be intended to carry real-time information, for example video or audio information, or other information, such as computer data.

FIG. 1c shows an example of a wobble of the track. A detail 12 of the track 9 shows a periodic variation of the lateral position of the pregroove 14, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the prior art wobble as shown in FIG. 1c in a writable CD system comprising disc information encoded in such a manner can be found in U.S. Pat. No. 4,901,300 (PHN 12.398) and U.S. Pat. No. 5,187,699 (PHQ 88.002).

During readout by scanning the wobble modulation is detectable via a second type of variations of the radiation, such as variation of intensity in the cross section of the reflected beam detectable by detector segments or additional detectors for generating tracking servo signals. Detecting the wobble for a tracking servo system is well known from the above mentioned CD-R and CD-RW system. The wobble modulation is used to encode physical addresses and control information, for example as in the DVD+RW system and in U.S. Pat. No. 6,538,982.

FIG. 2 shows a recording device having a formatting function. The device is provided with means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The error signals 35 are also coupled to a pre-track demodulation unit 32 for retrieving the physical addresses and other control information from the pre-track pattern constituted by wobble modulation or pre-pits. The main scanning signal 33 is processed by read processing unit 30 of a usual type including a demodulator, deformatter and output unit to retrieve the information.

The device is provided with recording means for recording information on a record carrier of a re-writable type, for example DVD+RW, according to a predefined recording format for read-only type record carriers such as DVD. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory (computer readable medium) and interfaces for performing the procedures and functions as described below. The control unit 20 may also be implemented as a state machine in logic circuits. According to the invention the device has a formatting unit 36 coupled to the control unit for formatting a record carrier under the conditions as described below. In an embodiment the formatting function is implemented in a computer program for a PC having a recording unit, e.g. a DVD+RW drive.

The recording means, including control unit 20, formatter 28, and modulator 29, are for recording the information in the track according to a predefined recording format for constituting a recording area containing user data preceded by a lead-in zone located at the start of the recording layer and followed by a lead-out zone located at the end of the user data.

FIG. 3 shows a record carrier having information according to a predefined recording format. A first record carrier 37 is fully recorded (upper disc) and a second record carrier 42 (lower disc) is only partly recorded, and still has a blank area 41. Both discs have a central area not having any recorded information. Radially next lies a lead-in zone 38 having a predefined starting and ending radius. Adjacent to the end of the lead-in 38 a recording area for main data 39 begins. Adjacent to the end of the recorded main data a lead-out zone 40 is provided. The examples given below relate to DVD recordable discs such as DVD+RW and DVD-RW. Recording of discs should be such that compatibility with DVD-ROM drives is guaranteed. Other recording formats have similar requirements.

FIG. 4 shows a logical layout of a recordable disc according to the DVD recording format. Recordable discs, once written, have a lead-in area, a data area, and a lead-out area, which need not extend to the end of the disc. In DVD four "areas" are defined: lead-in zone 38, main-data 39, middle area (only for dual layer discs) and a lead-out zone 40. The main data are 39 starts at a fixed address 45, for DVD the address is 0x30000. The data in each area is marked corresponding to the area by a two bit indicator 47 in the header 48 of each sector 46. A group of 16 sectors 46 together constitutes a block including error correction codes, usually called an ECC block, which is the smallest unit of data that can be recorded. A DVD disc according to the DVD read-only standard contains three contiguously written areas: a lead-in, main-data area and lead-out.

A recordable disc initially is a blank disc without any data, only having a pre-track pattern as described above with reference to FIG. 1. Unwritten areas are not accessible to a read-only device that cannot detect the pre-track pattern, and are called "ice". Hence, the first state of every disc is totally iced. The next disc state, areas will be written with data. A first step of writing usually is by the "Format" command. In response to this command, the drive will write the lead-in 39. Via "write" commands, the main-data area will be filled and via a "Close-Track Session" command, the recording session will be ended and the lead-out may be recorded. According to the DVD recording format the lead-in contains a control data zone having control data 43 in 192 consecutive ECC blocks. The control data contains physical format information, for example a pointer 44 to the end of user data (bytes 9-11 indicate the end sector number of the data area, see Table 3.4.1.3.1-2 in the DVD standard). Hence at a "close track session" command, or eject or power-down, the lead-out zone is determined. As a consequence the control data in the lead-in area must be updated. At that point, the lead-in area reflects the state of the recordable disc.

The recording device is provided with a formatting unit 36, for example implemented as a function of the control unit 20. The formatting of a blank record carrier according to the DVD+RW recording format is as follows. The formatting is inter ala required for preparing the record carrier for playback on a reading device that cannot detect the pre-track pattern.

The disc shall be considered fully formatted if all areas in the recordable zone called Information Zone have been recorded. The Main data bytes in the ECC blocks can contain relevant data or can be set to dummy data (all bytes (00)). The disc shall be considered partially formatted if at least a number of zones called the Inner Disc Test Zone, the Inner Drive Test Zone, the Guard Zone 1, the Reserved Zone 1, the Reserved Zone 2, the Inner Disc Identification Zone, the Reserved Zone 3, the Reference Code Zone, the Buffer Zone 1, the Control Data Zone and the Buffer Zone 2 in the Lead-in Zone have been recorded. To indicate the status of the disc, the Disc Identification Zones shall contain a Formatting Disc Control Block (FDCB) (see FIG. 5).

Formatting can be done in different ways:
1) Pre-formatting is the conventional way of formatting used for storage media Pre-formatting is to be applied before any User Data is recorded onto the disc. The Inner Disc Identification Zone and the Outer Disc Identification Zone shall contain an FDCB according to FIG. 5 indicating pre-formatting in progress. After the pre-formatting process, the disc is fully formatted. Pre-formatting consists of the following steps:—write Lead-in Zone,—write Data Zone,—write Lead-out Zone,—verify the Data Zone (optional)
2) Background formatting is a formatting process that runs in the background during use of the disc on a recorder. After the Background formatting process, the disc is fully formatted. User Data may be recorded to the disc during the Background formatting process. This process consists of the following steps:—Initialization—De-icing—Finalization—Verification.

Initialization shall always be applied to a maiden disc, while the other steps are optional. During initialization control data indicating the status of the record carrier is recorded, for example the FDCB (see FIG. 5). The disc may be interchanged at any time after the first step.

De-icing is the process of recording ECC blocks in the Data Zone. During the de-icing phase, unrecorded areas in the Data Zone shall be filled with ECC blocks containing all (00) bytes or with User Data when requested. All recorded areas shall be registered in the Formatting bitmap of a Formatting Disc Control Block (FDCB) in the Inner (and Outer) Disc Identification Zone. During the time intervals when the drive is idle, the De-icing process, controlled by the drive, can proceed in the background. When the application requests disc access, the De-icing process is suspended and the control of the disc is returned to the application. Application requested writes to previously unrecorded areas shall be registered in the FDCB. During background De-icing the drive should keep the FDCB updated. When an eject is requested during background De-icing, the drive shall update the FDCB before ejecting the disc.

Finalizing is performed when the De-icing process has finished and all areas in the Data Zone have been recorded. The drive shall add the Lead-out Zone and the Lead-in Zone shall be finished by adding the Initial Zone Verification is the process of reading and checking all ECC blocks in the Data Zone. If an ECC block is found unreliable, this block can be replaced using a Defect Management system. A Last Verified Address (LVA) pointer in the Formatting Disc Control Block (FDCB, see FIG. 5) in the Inner and Outer Disc Identification Zone shall register the area that has been checked. During the time intervals when the disc is idle, the Verification process, controlled by the drive, can proceed in the background. When the application requests disc access, the Verification process is suspended and the control of the disc is returned to the application. During background Verification the drive should keep the FDCB updated. When an eject is requested during background Verification, the drive shall update the FDCB before ejecting the disc.

FIG. 5 shows formatting control data. A table is shown giving the layout of a Formatting Disc Control Block (FDCB), including a Physical sector number (within the ECC block), a Main Data byte position (within the physical sector), a Description of the control information and the number of bytes involved. The FDCB is recorded on a predetermined location, for example the Inner and Outer Disc Identification Zone as defined in DVD+RW. The FDCB contains administrative data about the formatting status of the record carrier, in particular defined as follows:

Physical Sector 0/bytes $D_0$ to $D_3$—Content Descriptor
these bytes identify the Formatting DCB and shall be set to represent the characters "FDC" and a version number 0.

Physical Sector 0/bytes $D_4$ to $D_7$—Unknown Content Descriptor Actions
shall be set to (0000000D) indicating that if this Disc Control Block is not known to the system, the DCB shall not be overwritten, the disc shall not be reformatted, writing to the Data Zone shall not be allowed, while transferring the DCB information from the drive to the host computer is allowed.

Physical Sector 0/bytes $D_8$ to $D_{39}$—Drive ID
these bytes shall contain a drive identification.

Physical Sector 0/bytes $D_{40}$ to $D_{43}$—FDCB update count
these bytes shall specify the total number of update operations of the FDCB. This field shall be set to (00000000) during the creation of the FDCB, and shall be incremented by one each time the FDCB is re-written.

Physical Sector 0/byte $D_{44}$ to $D_{47}$—Formatting status and mode byte
Byte $D_{44}$—Formatting status flags
bits 7 to 6:
ZERO ZERO=disc is not formatted
ZERO ONE=disc has been partially formatted
ONE ZERO=disc has been fully formatted by user
ONE ONE=disc has been fully formatted by manufacturer
bit 5:
ZERO=the FDCB on the disc reflects the actual status of the disc
ONE=the Formatting process of the drive is active and the FDCB on the disc might not reflect the actual status of the disc
Byte $D_{45}$—Verification status flags
bits 7 to 6:
ZERO ZERO=disc is not verified
ZERO ONE=disc has been partially verified
ONE ZERO=disc has been fully verified by user
ONE ONE=disc has been fully verified by manufacturer
Byte $D_{46}$—Recording status flags
bit 7:
ZERO=Lead-in is recorded from address (02A480) to address (02FFFF)
ONE=Lead-in is fully recorded
bits 6 to 5:
ZERO ZERO=No Lead-out has been recorded
ZERO ONE=Temporary Lead-out has been recorded
ONE ZERO=Lead-out is recorded from address (260540) to address (26193F)
ONE ONE=Lead-out is fully recorded
Byte $D_{47}$—reserved Physical Sector 0/bytes $D_{48}$ to $D_{51}$—Last Written Address
These 4 bytes shall indicate the last sector number of the last ECC Block of the contiguously recorded part of the Data Zone (not including any type of Lead-out Zone) starting from address (030000). (There shall be no unrecorded ECC Blocks between address (030000) and the LWA.)

Physical Sector 0/bytes $D_{52}$ to $D_{55}$—Last Verified Address
These 4 bytes shall indicate the last address of the contiguously verified area starting from address (030000). If not in use the LVA can also be set to (00000000).

Physical Sector 0/bytes $D_{56}$ to $D_{59}$—Bitmap Start Address
These 4 bytes shall indicate the address of the first ECC Block represented in the Formatting bitmap. This value shall be less than or equal to the Last Written Address. They shall be set to (00000000) if the disc is fully Formatted or if the Formatting Bitmap is not used.

Physical Sector 0/bytes $D_{60}$ to $D_{63}$—Bitmap Length
These 4 bytes shall indicate the number of ECC Blocks represented in the Formatting bitmap. They shall be set to (00000000) if the disc is fully Formatted or if the Formatting Bitmap is not used.

Physical Sector 0/bytes $D_{64}$ to $D_{95}$—Disc ID
These 32 bytes shall be recorded with a random, statistically unique, 256-bit binary number at initialization of the disc.

Physical Sector 0/bytes $D_{96}$ to $D_{127}$—Application dependent
This field shall consist of 32 bytes and is reserved for use by the application to store information such as specific copy protection data If this setting is not specified by the application, the bytes shall be set to (00).

Physical Sector 0/bytes $D_{128}$ to $D_{191}$—List of DCBs
To improve the robustness and the time to access the actually valid DCBs, it is recommended to store a list representing the 16 locations of the Inner/Outer Disc Identification Zone with the Content Descriptor of the DCB contained in each of these locations.

Physical Sector 1 to 9/bytes $D_0$ to $D_{2047}$—Formatting bitmap
Physical Sectors 1 to 9 of the FDCB contain a bitmap, where each bit reflects the recording status of one ECC block. Bit 0 (the 1sb) of Main Data byte $D_0$ of Sector 1 represents the first ECC block indicated by the Bitmap Start Address, bit 1 of Main Data byte $D_0$ of Sector 1 represents the next ECC block, following the ECC Block indicated by the Bitmap Start Address, etc. All remaining bits in Physical Sectors 1 to 9 following the bitmap shall be set to ZERO.
The ECC blocks in the bitmap are identified by a sequence number i, where i starts at 0 for the ECC block at the Bitmap Start Address. Bit n of Main Data byte $D_m$ of Sector k represents the $i^{th}$ ECC block from the Bitmap Start Address:

$i=[(k-1)\times 2048+m]\times 8+n$, where $k=1 \ldots 9$, $m=0 \ldots 2047$, $n=0 \ldots 7$
Address of the first Physical Sector of the $i^{th}$ ECC block=Bitmap Start Address+i×16. If the bit representing the $i^{th}$ ECC block is set to ONE, then the $i^{th}$ ECC block has not been recorded. If the bit representing the $i^{th}$ ECC block is set to ZERO, then the $i^{th}$ ECC block has been recorded.
FIG. 6 shows formatting of a re-writable record carrier. According to the invention the formatting includes the following steps. A record carrier is present in a recording device and a format command is received in a start 61. In a first step 62 (TEST) it is detected if the record carrier is blank, i.e. an unrecorded record carrier not containing information, e.g. by detecting unrecorded areas in positions which should contain control information according to the predefined recording format. For example in a DVD type record carrier a location in the lead-in area can be scanned to detect recorded control information. If the record carrier is blank (BLANK) the formatting continues in a standard formatting step 64 (FORMAT BLANK) as explained above to achieve the formatted state 67. If the record carrier is already recorded (REC), but has to be formatted again, for example due to a user command such as the IDE command "Format", the formatting continues with a second step 63 (SIZE). A pre-existing contiguously written area that extends from the beginning of the recording area is determined. The size of the contiguous area may be detected by scanning the recording area until an unrecorded part is detected, or may be derived from file system information. In an embodiment the size of the contiguous are is detected from format status information according to the predefined recording format, e.g. a last written address parameter as shown in FIG. 5.

In a third step 65 (Write Lead-In) control data is written on the record carrier in areas that are predefined to contain information according to the predefined recording format, for example certain parts of the lead-in area In an embodiment the control information includes a parameter indicating that the recording area does not contain user data, for example an end user data pointer as defined in DVD and shown in FIG. 4. The third step corresponds to a similar step in the formatting of a blank record carrier.

In an embodiment the formatting means 36 are arranged for writing data on the record carrier indicating that the recording area does not contain user data as follows. Dummy data blocks are written in at least one predetermined address range that is known to be used for storing file system data. As the file system will try to retrieve its file system data, it will retrieve the dummy data instead, and will assume that the record carrier is an empty record carrier. For the dummy data a suitable data is blocks filled with zero data. In an embodiment formatting means 36 are arranged for said writing dummy data as follows. Dummy data is written in a first predetermined address range at the beginning of the recording area and/or a second predetermined range at the end of the recording area as the at least one predetermined range of addresses. In practical file systems the beginning and/or end of the recording area are used to store predetermined elements of file system data, for example around so-called anchor points. By setting the address ranges to be filled with dummy data at a size overlapping the ranges used by substantially all commonly used file systems, the dummy data writing can be done without taking into consideration the type of file system that previously has written data on the record carrier. Hence the address ranges are based on address ranges known to be used for file system data by a plurality of file system versions.

Finally in a step 66 (Write FDCB) on the record carrier status information is provided indicating a size of a contiguously written area that extends from the beginning of the recording area The indicated size is based on the size detected in the second step 63. For example the 'last written address' parameter may be maintained unchanged in a Format Disc Control Block (FDCB as shown in FIG. 5). In an embodiment also other administrative data of the formatting, such as the last verified address LVA or the Formatting bitmap (see FIG. 5), is maintained.

In an embodiment a control data block containing the 'last written address' parameter is not overwritten at all, but maintained as recorded earlier. In an embodiment a control data block containing the 'last written address' parameter is overwritten by a new control data block, in which other control parameters are adapted, e.g. the Drive ID parameter in the FDCB of FIG. 5.

In an embodiment, in response to the format command for a previously written disc, the drive does not reset the disc administration in the lead-in and resets the end-user pointer in the control data zone as described above. For a blank disc, the drive writes a shortened lead-in. The lead-in which the drive writes will start at 23.4 mm and not at the lowest address, required by the DVD-ROM standard of 22.9 mm. This saves 44 seconds for a standard speed (1×) DVD writer. Further only areas containing control information are recorded in the lead-in. By not having to zero-fill areas in the lead-in, except the administrative areas, in the region from 23.4 to 24.0 mm, a (1×) DVD writer saves 30 seconds. In an embodiment the lead-in areas not recorded for the shortened lead-in are recorded by filling in zero data in a background mode during later recording sessions.

Although the invention has been mainly explained by embodiments using optical discs according to the DVD standard, the invention is also suitable for other standards like BD (Blue-ray Disc) and other record carriers such as rectangular optical cards, magneto-optical discs or any other type of information storage system that has a pre-applied track pattern on a writable record carrier. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for recording information on a record carrier of a re-writable type by writing marks in a track on a recording layer via a beam of radiation, the recording layer comprising a pre-track pattern indicating the position of the track, the device comprising a head for providing the beam, recording means for recording the information in the track according to a predefined recording format for constituting a recording area containing user data preceded by a lead-in zone located at the start of the recording layer, and formatting means for formatting the record carrier, the formatting comprising writing data on the record carrier indicating that the recording area does not contain user data, and providing on the record carrier status information indicating a size of a contiguously written area that extends from the beginning of the recording area in dependence on detecting a pre-existing contiguously written area that extends from the beginning of the recording area, wherein the formatting means are arranged for recording a shortened lead-in starting at a shifted starting position beyond a predefined starting position and/or ending at position before a predefined ending position, in particular the predefined recording format being DVD and the shifted starting position being 23.4 mm radial.

2. The device as claimed in claim 1, wherein the formatting means are arranged for said detecting by retrieving status information indicating a size of a contiguously written area that extends from the beginning of the recording area.

3. The device as claimed in claim 1, wherein the formatting means are arranged for said providing by maintaining status information indicating a size of a contiguously written area that extends from the beginning of the recording area in the event of a previously written record carrier.

4. The device as claimed in claim 1, wherein the formatting means are arranged for said providing by maintaining status information in the lead-in zone relating to de-icing and resetting a control parameter indicating the end of the user data.

5. The device as claimed in claim 1, wherein the formatting means are arranged for said detecting by detecting if the record carrier contains written data in the recording area, and if not, setting the size of the pre-existing contiguously written area to zero.

6. The device as claimed in claim 1, wherein the formatting means are arranged for said writing data on the record carrier indicating that the recording area does not contain user data by writing dummy data in at least one predetermined address range used for storing file system data, in particular the dummy data being zero data.

7. The device as claimed in claim 6, wherein the formatting means are arranged for said writing dummy data in a first predetermined address range at the beginning of the recording area and/or a second predetermined range at the end of the recording area as the at least one predetermined range of addresses, in particular the first and second ranges being predetermined based on address ranges known to be used for file system data by a plurality of file system versions.

8. Method of recording information on a record carrier of a writable type by writing marks in a track on a recording layer via a beam of radiation, the recording layer comprising a pretrack pattern indicating the position of the track, the method comprising recording the information in the track according to a predefined recording format for constituting a recording area containing user data preceded by a lead-in zone located at the start of the recording layer, and formatting the record carrier, the formatting comprising writing data on the record carrier indicating that the recording area does not contain user data, and providing on the record carrier status information indicating a size of a contiguously written area that extends from the beginning of the recording area in dependence on detecting a pre-existing contiguously written area that extends from the beginning of the recording area, wherein the predefined recording format includes recording a shortened lead-in starting at a shifted starting position beyond a predefined starting position and/or ending at position before a predefined ending position, and the shifted starting position being 23.4 mm radial.

9. Computer program stored on a computer readable medium, which program is operative to cause a processor to:
initiate recording information on a re-writable record carrier according to a predefined recording format for constituting a recording area containing user data preceded by a lead-in zone located at the start of the recording layer, and initiate formatting, the formatting comprising writing data on the record carrier indicating that the recording area does not contain user data, and initiate providing on the record carrier status information indicating a size of a contiguously written area that extends from the beginning of the recording area in dependence on detecting a pre-existing contiguously written area that extends from the beginning of the recording area, wherein the predefined recording format includes a shortened lead-in starting at a shifted starting position beyond a predefined starting position and/or ending at position before a predefined ending position, and wherein the shifted starting position is 23.4 mm radial.

10. Device for recording information on a record carrier of a re-writable type by writing marks in a track on a recording layer, the recording layer comprising a pre-track pattern indicating the position of the track, the device comprising:
a recording device configured to record the information in the track according to a predefined recording format for constituting a recording area containing user data preceded by a lead-in zone located at the start of the recording layer, and
a processor configured to control writing data on the record carrier indicating that the recording area does not contain user data, and configured to provide on the record carrier status information indicating a size of a contiguously written area that extends from the beginning of the recording area in dependence on detecting a pre-existing contiguously written area that extends from the beginning of the recording area, wherein the processor is arranged to control recording of a shortened lead-in starting at a shifted starting position beyond a predefined starting position and/or ending at position before a predefined ending position, wherein the predefined starting and ending positions are defined by a recording format, and wherein the shifted starting position is 23.4 mm radial.

11. The device as claimed in claim 9, wherein the recording format is a DVD recording format.

* * * * *